United States Patent [19]

Malutich

[11] Patent Number: 4,651,510
[45] Date of Patent: Mar. 24, 1987

[54] BLADE FOR ROTARY LAWN MOWER

[76] Inventor: William J. Malutich, R.R. 1, Toddville, Iowa 52341

[21] Appl. No.: 721,152

[22] Filed: Apr. 8, 1985

[51] Int. Cl.⁴ .......................................... A01D 34/73
[52] U.S. Cl. ........................................ 56/295; 56/13.4
[58] Field of Search ................ 56/295, 13.4; 30/34 R, 30/34 A, 34 B, 35

[56] References Cited

U.S. PATENT DOCUMENTS

| | | | |
|---|---|---|---|
| 2,869,311 | 1/1959 | Beeston, Jr. | 56/295 |
| 3,097,468 | 7/1963 | Johnson | 56/295 |
| 3,184,907 | 5/1965 | Harloff | 56/295 |
| 3,447,291 | 6/1969 | Guetterman | 56/295 |
| 3,465,508 | 9/1969 | Edwards | 56/295 |
| 3,596,453 | 8/1971 | Smith | 56/295 |
| 3,665,692 | 5/1972 | Hughes | 56/295 |
| 4,375,148 | 3/1983 | Beck | 56/295 |
| 4,513,563 | 4/1985 | Roser et al. | 56/295 |

Primary Examiner—Paul J. Hirsch
Attorney, Agent, or Firm—James C. Nemmers

[57] ABSTRACT

A rotary lawnmower blade that includes cutting edges on removable cartridges which can be replaced without the use of tools. The blade is hollow in design with air inlets that pick up high volumes of air as the blade rotates, compress the air and discharge it at an increased velocity to aid in discharging the grass clippings and other debris. The blade also is designed to increase the suction action of the blade as it rotates in order to make the grass more erect and also pick up the grass clippings more effectively. Also included in the design is an unique method of attaching the blade to the engine drive shaft so as to minimize damage if the blade strikes a solid object.

11 Claims, 6 Drawing Figures

BLADE FOR ROTARY LAWN MOWER

BACKGROUND OF THE INVENTION

Rotary lawnmowers have been marketed for many decades and are used almost exclusively by homeowners. Rotary lawnmowers are also used in large scale commercial applications as well. Throughout the years, many changes and improvements have been made to the rotary mowers themselves. For example, more efficient engines have been designed, electric start and other convenience features have been added, and a number of self-propelled models are available. Although numerous advances have been made to the design of the mower itself, the blade has not basically changed from the original design of a flat, rectangular steel blade sharpened on the forward leading edge. The blades must be removed from the mower to be properly sharpened, a procedure which requires tools and may result in the blade becoming unbalanced. Eventually, after repeated sharpenings, the blade must be replaced.

There have been numerous attempts to improve the original blade design by providing removable cutting edges, reversible cutters and disposable cutters. None of these designs have ever become commercially successful primarily because they are expensive and in many instances more difficult to install than the standard blade. In addition, some of these designs, in an effort to add convenience and reduce cost, have resulted in designs that are potentially dangerous. Therefore, the present commercially available original equipment blade and all replacement blades are basically the same blade design that has been used for many, many years. There is therefore a need for an improved design of a blade for rotary mowers that will make it easier for the user, especially the ordinary homeowner, to always have a sharp blade on the rotary mower. There is a further need for improved designs that will more effectively pick up cut grass and other debris and more efficiently discharge it from the mower, especially where the clippings and other debris are being bagged.

There is a further need for a blade design which will minimize damage to the blade and engine when solid objects are struck by the blade.

SUMMARY OF THE INVENTION

The blade of the invention has a basic rotor with a removable cartridge at each end, each cartridge having a cutting blade. Once installed, the rotor never has to be removed for sharpening since the two blade-carrying cartridges are attached to the rotor using a dovetail type construction which permits ease of installation and removal without the use of tools. The removable cartridges slide on in a direction toward the end of the rotor thus assuring that they are always secure and are held in a locked position by the centrifugal force as the rotor rotates.

Additionally, the rotor is hollow and during rotation gathers in a relatively high volume of air which is forced through small discharge openings in the ends of the rotor. This increases the velocity of the air which greatly improves the ability of the rotor to pick up grass clippings, leaves and other debris while keeping the internal surfaces of the mower housing "blown clean".

The rotor also is provided with tilted blades which assist in the suction action of the rotating rotor.

The rotor blade is also provided with a combination washer-shear pin arrangement which is used to connect the rotor and drive shaft so as to minimize damage to the blade and engine crank shaft if a solid object is struck by the rotating blade.

Other specific features of the invention will become apparent from the detailed description of the preferred embodiment.

DESCRIPTION OF THE PREFERRED EMBODIMENT OF THE INVENTION

Figure 1:
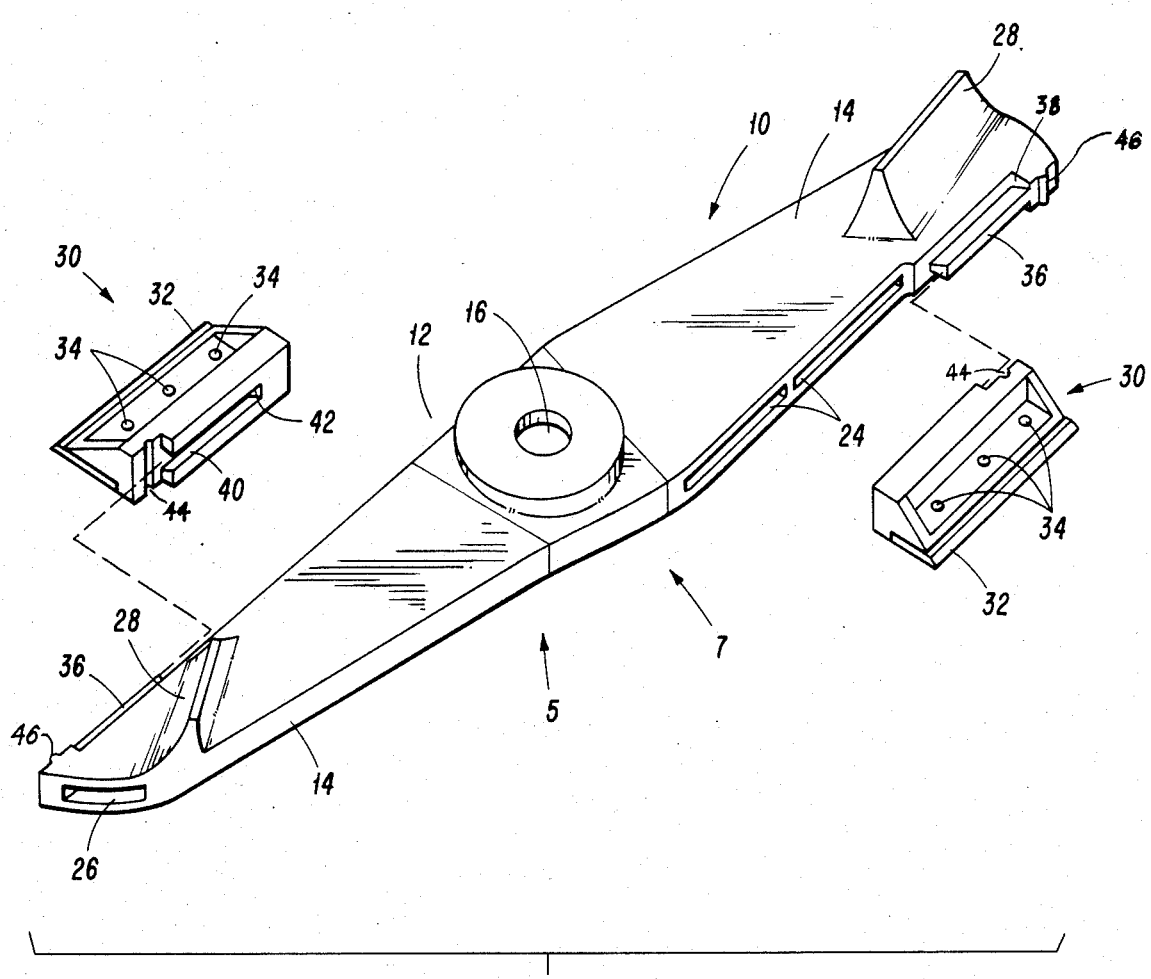
FIG. 1 is a perspective view of the rotor and showing the removable cartridges separated from the rotor itself.
Figure 2:
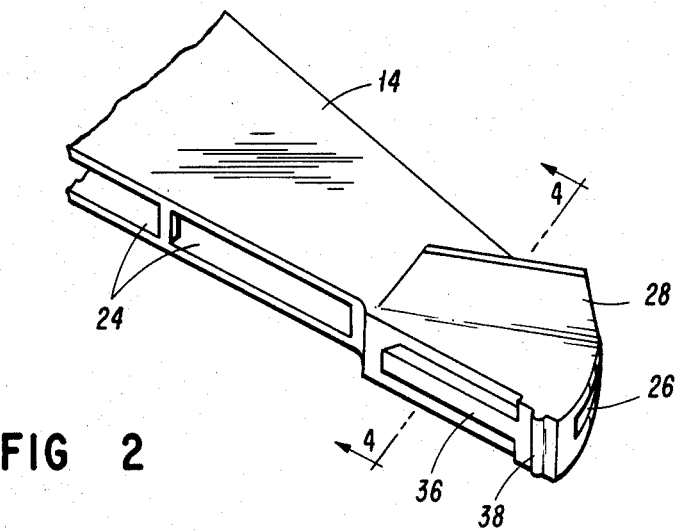
FIG. 2 is a perspective view of one end of the rotor with the removable cartridge not in place.
Figure 4:
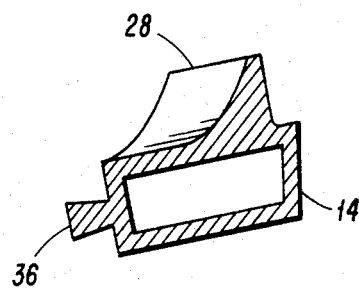
FIG. 4 is a sectional view taken on the line 4—4 of FIG. 2.

In FIG. 1, there is shown a perspective view of a blade for rotary lawnmowers constructed according to the principles of my invention. FIG. 1 is a view of the top and one leading edge of the rotor, the opposite leading edge being identical.

Figure 5:
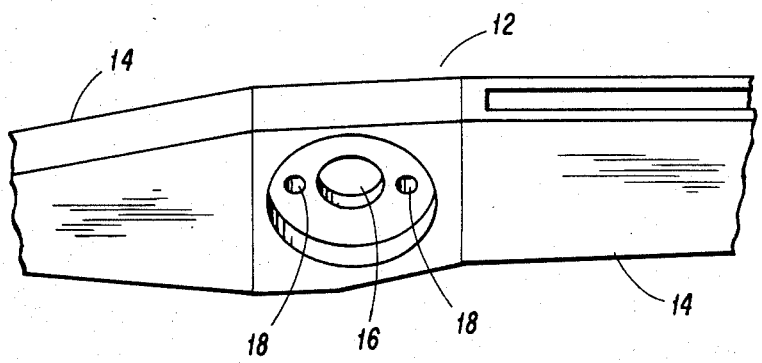
FIG. 5 is a perspective view of the bottom of the rotor hub.
Figure 6:
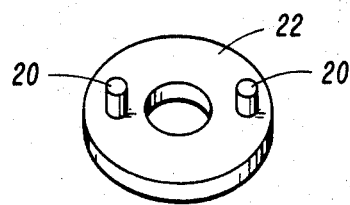
FIG. 6 is a perspective view of the shear-washer.

The rotor consists of a main rotor body indicated generally by the reference numeral 10. The body 10 is preferably injection-molded from reinforced plastic, which material has greater tensile and compression strength then steel. The body 10 has a central portion 12 with an arm 14 extending outwardly from the central portion 12. The central portion 12 has a central opening 16 and two circular recesses 18 at diametrially opposed positions in the bottom of the central portion 12 (See FIG. 5). The circular recesses 18 are adapted to receive drive pins 20 of a washer 22 which is positioned between the rotor and the bearing surface around the drive shaft (not shown) extending downwardly within the housing of the mower as is well known. Central opening 16 and the opening in the washer 22 receive the drive shaft which is commonly threaded at its outer end to receive a retaining nut that would maintain engagement of the drive pins 20 in the circular recesses 18 when the rotor is properly installed. Drive pins 20 and washer 22 are preferably of a relatively soft plastic so that the pins 20 will shear off in the event the rotor strikes a foreign object during rotation thus permitting the rotor to stop without damaging either the rotor or the crankshaft of the engine of the mower.

Referring now to FIGS. 1 through 4, it is seen that each arm 24 is hollow and has a pair of elongated openings formed along the leading edge of the rotor. The interior of each arm 14 provides a chamber the cross sectional area of which decreases from the central portion 12 to the outer end of the arm 14. This is because each arm 14 is tapered as shown and terminates in a discharge opening 26 at the outer end. Thus, as the rotor rotates, air is introduced into the interior of each arm 14 in relatively large quantities. I have estimated that the volume of air is as high as 250 cubic feet a minute. This large volume of air is then forced through the discharge opening 26 in each end of each arm 14, and in so doing, the velocity of the air is substantially increased so that the action of the rotating rotor operates much like an air compressor. The high velocity air discharged from each discharge opening 26 thus serves to keep the interior of the housing of the mower clean, and also serves to increase the effectiveness of the pick up of the grass clippings and other debris.

Figure 3:
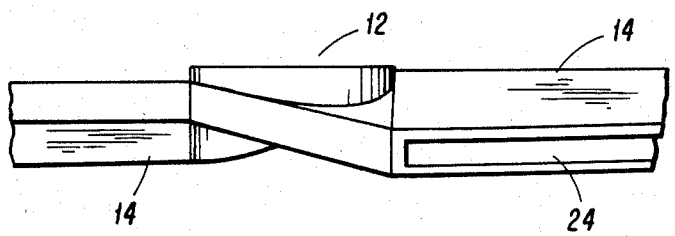
FIG. 3 is an elevational view of the center portion of the rotor.

In addition, as best seen in FIG. 3, each arm 14 is tilted downwardly toward the leading edge and to the plane of rotation much like a propeller or fan blade. Because of this design, vertical suction inside the mower housing is substantially increased thus pulling the grass to be cut to an erect position which aids in a clean uniform cutting as well as enhancing the subsequent discharge of the clippings and other debris from the mower housing.

As a further aid to this suction action, the outer end of each arm is provided with wings 28 that extend upwardly and at an angle to the leading edge of the rotor. These wings thus create movement of air upwardly and outwardly toward the ends of the arms 14 to aid in the suction effect of the rotating rotor and also to aid in discharging the grass clippings and other debris from the mower housing. Although wings 28 are shown as being formed integrally with the main rotor body 10, they can, if desired, be formed so as to be removable and reversible. In the reverse position, wings 28 would assist in the mulching action of the mower when used for that purpose.

One of the main features of the blade of the invention is the use of removable cutting cartridges indicated generally by the reference numeral 30. Cartridges 30 preferably are injection-molded from reinforced plastic similar to the main rotor body 10. Each cartridge 30 has a steel cutting blade permanently attached by means of rivets 34 or other suitable fasteners. The cutting blades 32 are preferably made from a high chrome tool steel that is oil hardened and tempered back for toughness and extremely long life. The cartridges 30 are adapted to be easily installed and removed without the aid of tools. To this end, each arm 14 has formed along its leading edge and near its outer end a projection 36 that is the male portion of a dovetail joint. The projection 36 extends radially toward the outer end of each arm 14 to a shoulder 38 that serves as a stop. Each cartridge 30 has on its inner end a female dovetail groove 40 corresponding to the male dovetail projection 36 on the end of each arm 14. As best seen in FIG. 1, groove 40 extends radially inwardly toward a shoulder 42 which limits the outward movement of the cartridge 30. To aid in locking the cartridge 30 in place on the outer ends of the main rotor body 10, a vertical groove 44 is formed radially outwardly from the open end of the female dovetail groove 40. When the cartridge 30 is properly in place, the groove 44 will engage a corresponding projection 46 near the outer end of rotor body 10 just beyond the male dovetail projection 36.

Obviously, cartridge 30 can be easily installed by engaging the projection 36 on arm 14 into the groove 40 of the cartridge 30 and sliding the cartridge 30 radially outwardly until the projection 46 is locked into groove 44. With this construction, it is virtually impossible for the cartridge to become detached from the rotor, especially since the centrifugal force during rotation will force the cartridge against the shoulder 38 and further lock it in place.

The removable cartridge design is such that the rotor itself never has to be removed from the drive shaft of the mower when the blades 32 become dull. If blades 32 become dull, the cartridges 30 are merely removed by sliding them off the rotor, discarding them and replacing them with new cartridges. Because of the construction of the cartridges by injection molding, their cost can be kept to a minimum so that replacement of the cartridges should be less than the cost of sharpening the standard one piece metal blade.

It will thus be evident from the foregoing description that I have designed an improved blade for rotary mowers which will more effectively and uniformly cut grass and pick up and discharge the clippings and other debris. The design of the blade will also tend to keep the interior of the mower housing clean because of the compressed air effect due to the blade design. Because of the removable cartridges, maintenance is simple and inexpensive. Having thus described the invention in connection with a preferred embodiment thereof, it will be obvious to those skilled in the art that various revisions and modifications can be made to the preferred embodiment without departing from the spirit and scope of the invention. It is my intention however that all such revisions and modifications as are obvious to those skilled in the art will be included within the scope of the following claims.

What is claimed is as follows:

1. A blade for rotary power lawnmowers and the like having an engine drive shaft to which the blade is removably attached, said blade comprising a central portion having a central opening adapted for attachment to the drive shaft, arms extending in opposite directions from the central portion, each arm having a leading edge and a trailing edge terminating at an outer end, each arm being hollow so as to form an interior chamber, an air inlet in the leading edge of each arm and an air discharge in the outer end of each arm so as to provide for air flow into and out of the chamber, the chamber and its inlet and discharge being formed so as to increase the velocity of the air flow from the inlet to the discharge, and a cutting means on the leading edge of each arm near the outer end.

2. The blade of claim 1 in which the cross-sectional area of the chamber is greater near the central portion of the arm than it is at the discharge end.

3. The blade of claim 1 in which when in operating position, each arm is tilted downwardly toward its leading edge and relative to the plane of rotation so as to create upward air movement as the blade rotates.

4. The blade of claim 1 in which the cutting means is removable.

5. The blade of claim 4 in which the leading edge of each arm has a radially extending projection near its end and the cutting means has a groove corresponding to the projection which provides for limited radially outward movement of the cutting means while preventing movement in any direction other than a radial direction.

6. The blade of claim 5 in which the projection and groove are a tongue-and-groove arrangement, and a shoulder is formed at the outer end of the tongue to limit movement of the cutting means in the radially outward direction.

7. The blade of claims 1, 2, 3, 4, 5 or 6, in which the central portion is provided with a pair of axially extending recesses radially outwardly from the central opening, and a washer having a central opening is adapted to be positioned on the drive shaft, said washer having a pair of axially extending drive pins positioned to be inserted into the recesses in the central portion of the blade, the drive pins being of a material that will shear off when a predetermined force is applied to the pins such as when the blade strikes a foreign object during rotation.

8. A blade for rotary lawn mowers and the like having an engine drive shaft to which the blade is removably attached, said blade comprising a central portion having a central opening adapted for attachment to the drive shaft, arms extending in opposite directions from the central portion, each arm having a leading edge and a trailing edge terminating at an outer end, cutting means removably attached to the leading edge of each arm near its outer end, each arm being sufficiently thick to provide for a radially extending projection extending circumferentially from the leading edge, and the cutting means having a groove corresponding to the projection which projection and groove provide for limited radially outward movement of the cutting means relative to the arm while preventing movement of the cutting means in any direction other than a radial direction, a stop on the outer end of each projection to prevent the cutting means from moving radially off the end of the arm, and a stop on the inner end of the groove in each cutting means to prevent the cutting means from being improperly installed on the end of the arm.

9. The blade of claim 8 in which the projection and groove are a dovetail arrangement to limit movement of the cutting means to movement only in the radial direction.

10. The blade of claim 8 in which a wing extends upwardly from each arm near its outer end, the wing having a concave leading surface that is at a negative angle to the leading edge of the arm.

11. The blade of claim 10 in which the central portion is provided with a pair of axially extending recesses radially outwardly from the central opening, and a washer having a central opening is adapted to be positioned on the drive shaft, said washer having a pair of axially extending drive pins positioned to be inserted into the recesses in the central portion of the blade, the drive pins being of a material that will shear off when a predetermined force is applied to the pins such as when the blade strikes a foreign object during rotation.

* * * * *